(12) United States Patent
Whalen et al.

(10) Patent No.: US 9,584,791 B1
(45) Date of Patent: Feb. 28, 2017

(54) IMAGE MISALIGNMENT CORRECTING SYSTEM, DEVICE, AND METHOD

(71) Applicant: ROCKWELL COLLINS, INC., Cedar Rapids, IA (US)

(72) Inventors: Donald J. Whalen, Cedar Rapids, IA (US); Brad A. Walker, Mount Vernon, IA (US); Scott E. Schultz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 322 days.

(21) Appl. No.: 14/013,172

(22) Filed: Aug. 29, 2013

(51) Int. Cl.
*H04N 13/02* (2006.01)
*H04N 13/00* (2006.01)

(52) U.S. Cl.
CPC ................ *H04N 13/0018* (2013.01)

(58) Field of Classification Search
CPC .................................................. G01C 23/005
USPC ......................................................... 348/47
See application file for complete search history.

(56) References Cited

U.S. PATENT DOCUMENTS

| 2013/0155093 A1* | 6/2013 | He .................. G01C 23/005 345/592 |
| 2014/0267422 A1* | 9/2014 | Feyereisen ............ B64D 45/00 345/634 |

* cited by examiner

*Primary Examiner* — Jamie Atala
*Assistant Examiner* — Masum Billah
(74) *Attorney, Agent, or Firm* — Daniel M. Barbieri; Donna P. Suchy; Angel N. Gerdzhikov

(57) ABSTRACT

Present novel and non-trivial system, device, and method for correcting misaligned images are disclosed. A system may be comprised of a source of first model data, a source of second model data, and an image generator ("IG"). The IG may be configured to perform a method comprised of receiving first model data representative of a first three-dimensional model; determining feature data of one or more first features located in an outside scene; receiving second model data representative of a second three-dimensional model in which one or more second features are located in the outside scene; determining differences data representative of feature differences between at least one first feature and at least one second feature; and applying the differences data to one or more pixel data sets, where such modification may be based upon a comparison between one or more first features and one or more correlating second features.

20 Claims, 5 Drawing Sheets

| Point | Pixel Location | Point | Pixel Location | Differences |
|---|---|---|---|---|
| 1 | (407, 431) | 8 | (548, 406) | (-141, 25) |
| 2 | (407, 273) | 9 | (548, 247) | (-141, 26) |
| 3 | (507, 431) | 10 | (648, 406) | (-141, 25) |
| 4 | (507, 273) | 11 | (648, 247) | (-141, 26) |
| 5 | (441, 456) | 12 | (583, 427) | (-142, 29) |
| 6 | (540, 456) | 13 | (683, 427) | (-143, 29) |
| 7 | (540, 298) | 14 | (683, 268) | (-143, 30) |
| 15 | (680, 517) | 19 | (728, 498) | (48, -19) |
| 16 | (728, 517) | 20 | (776, 502) | (48, -15) |
| 17 | (588, 48) | 21 | (673, 72) | (85, 24) |
| 18 | (820, 48) | 22 | (904, 92) | (84, 44) |

IMAGE MISALIGNMENT CORRECTING SYSTEM, DEVICE, AND METHOD

BACKGROUND OF THE INVENTION

Field of the Invention

This invention pertains generally to the field of display systems such as, but not limited to, aircraft display systems.

Description of the Related Art

Two vision systems employed commonly in the aviation industry are the synthetic vision system ("SVS") and the enhanced vision system ("EVS"). The SVS typically employs a terrain and/or obstacle database to create a three-dimensional perspective of the scene in front of the aircraft on a two-dimensional display unit, whereas the EVS typically employs image sensor(s) to acquire real-world image data representative of an image that may be presented on the screen of one or more display units. Each vision system has its advantages and its disadvantages. One of the advantages of the SVS is that the image is not affected by meteorological conditions; however, one of its disadvantages is its inability to display actual terrain/object located in a scene in front of the aircraft.

There are systems which simultaneously combine SVS image data with EVS image data. One such system has been disclosed by Wenger et al in U.S. Pat. No. 7,605,719 entitled "System and Methods for Displaying a Partial Images and Non-Overlapping, Shared-Screen Partial Images Acquired from Vision Systems," wherein a visual spectrum camera system may be used to determine the employment of an EVS image data set and an SVS image data set to form a combined image data set.

To enhance a pilot's situational awareness, image data of a scene located outside the aircraft acquired by the EVS may be overlaid, blended, or fused with image data of the scene generated by the SVS. For various reasons, common terrain and/or objects located in the scene and depicted in the two images of two image data sets may be misaligned.

BRIEF SUMMARY OF THE INVENTION

The embodiments disclosed herein present novel and non-trivial system, device, and method for correcting a misalignment between images. With the embodiments disclosed herein, an image generated by an EVS may be corrected and aligned with an image generated by an SVS, or vice versa.

In one embodiment, a system for correcting image misalignment is disclosed. The system may be comprised a source of first model data, a source of second model data, and an image generator ("IG") configured to receive first model data and second model data. In one embodiment, the first model data may have been generated from first sensor data acquired by a first image capturing device and second sensor data acquired by a second image capturing device. In another embodiment, the first sensor data and the second sensor data may be acquired by one image capturing device at a plurality of times. In an additional embodiment, the system could also be comprised of a presentation system.

In another embodiment, a device for correcting image misalignment is disclosed. The device may be comprised of the IG configured to perform the method disclosed in the following paragraph.

In another embodiment, a method for correcting image misalignment is disclosed. The method may be comprised of receiving first model data representative of a first three-dimensional model of an outside scene; determining feature data of one or more first features located in the outside scene; receiving second model data representative of a second three-dimensional model of the outside scene in which there are one or more second features; determining differences data representative of feature differences between one or more first features and one or more correlating second features; and applying the differences data to one or more pixel data sets representative of the outside scene. Additionally, the method may be further comprised of providing a plurality of pixel data sets to the presentation system including at least one pixel data set to which the differences data was applied. Also, the method may be further comprised of providing a combined pixel data set to the presentation system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
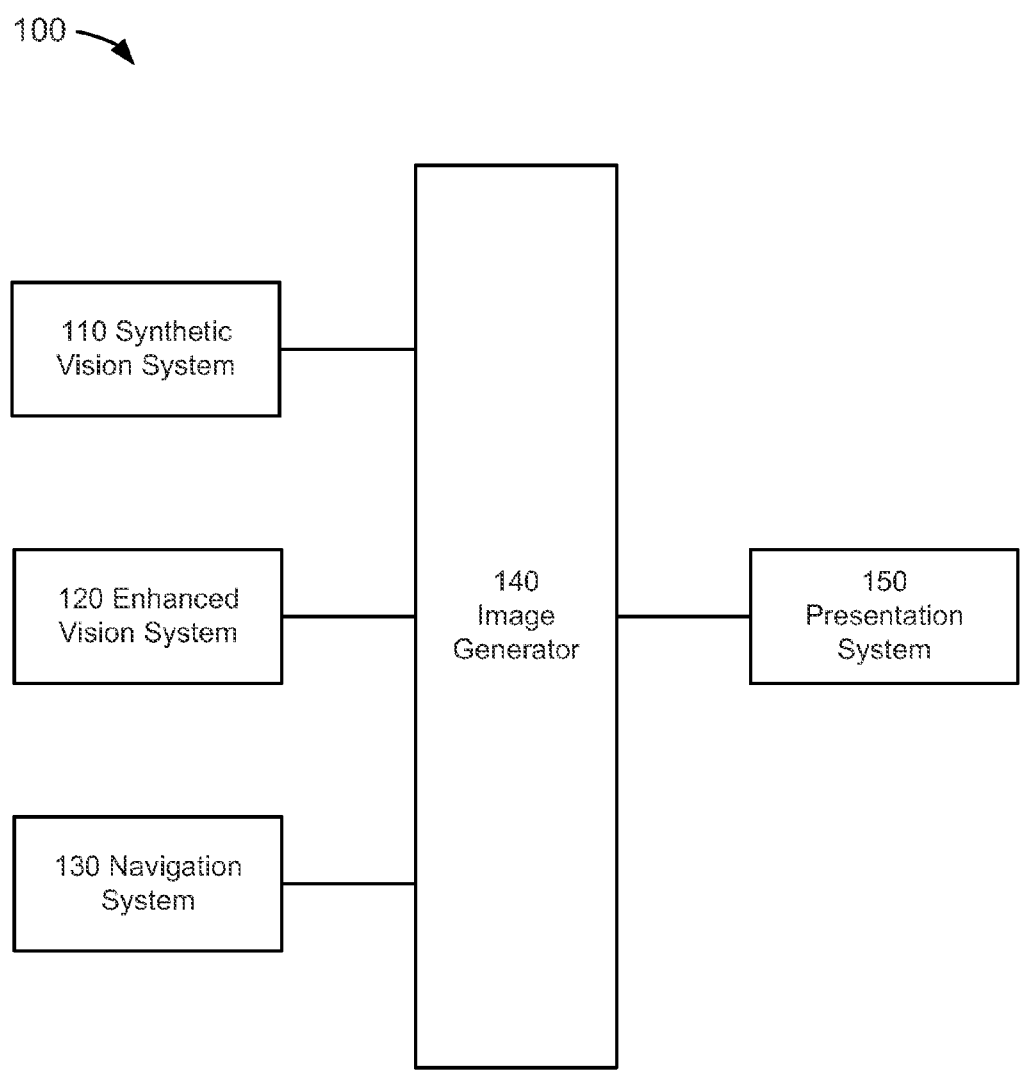
FIG. 1 depicts a functional block diagram of a system for correcting image misalignment.

FIG. 1 depicts a functional block diagram of an image misalignment correcting system 100 suitable for implementation of the techniques described herein. The functional blocks of the system 100 may include a synthetic vision system ("SVS") 110, an enhanced vision system ("EVS") 120, a navigation system 130, an image generator ("IG") 140, and a presentation system 150.

In an embodiment of FIG. 1, the SVS 110 could be comprised of any system which generates data representative of the synthetic image, where such image may be presented on one or more display units of the presentation system 150. The SVS 110 may be comprised of a source of terrain and/or obstacle data (e.g., a terrain and/or obstacle database) and/or a separate data processing system. The SVS 110 could employ the terrain and/or obstacle data source to create a three-dimensional perspective of a scene outside of the aircraft on a two-dimensional display unit of the presentation system 150. The SVS 110 could employ topographical colors similar to those depicted on standard aeronautical charts. The three-dimensional perspective and topographical coloring could present an alternative view to the "blue/brown" electronic attitude indicator used in classic electronic primary flight displays, a configuration known to those skilled in the art. The SVS 110 may allow the pilot to "see" a three-dimensional representation of terrain and/or obstacles ahead in two dimensions even though his visibility of the actual scene may be limited or obscured by meteorological or environmental conditions such as clouds, fog, and dust. The SVS 110 is a system known to those skilled in the art. As embodied herein, the SVS 110 could provide an image data set to the IG 140 for subsequent processing as discussed herein.

In an embodiment of FIG. 1, the EVS 120 could be comprised of any system that generates data representative of an enhanced image, where such image may be comprised of a real-world image presented on one or more display units of the presentation system 150. At least one infrared camera may be mounted on the aircraft for detecting infrared radiation emanating from the scene outside the aircraft; alternatively, at least one sensor may be mounted on the aircraft to detect non-visible, near-infrared radiation such as that emitted from many runway and landing lights the scene. The EVS 120 may employ a sensor operating in any spectral band even outside of infrared or visible bands. The EVS 120 may also employ a display-generating processor operatively coupled to the sensors and configured to generate a representation of the scene outside the aircraft on one or more display units of the presentation system 150.

The EVS 120 may be comprised of an infrared camera or other spectrally sensitive device and/or a separate data processing system. The infrared camera may be considered a forward-looking image capture device. Although discussed herein singularly, the infrared camera could be comprised of a plurality of cameras. Additionally, the infrared camera could mean one or more sensors for detecting non-visible, near infrared radiation such as that radiation emitted by many runway and landing lights, or otherwise detect the position of runway lights, for example, through sensing of reflections of radio-frequency pulses such as from a radar or light pulses such as from a LIDAR (a contraction formed from "light" and "radar" that is also known as LADAR), a system known to those skilled in the art. The infrared camera could receive enhanced image data representative of the scene outside aircraft that might be obscured from the pilot's view. The EVS 120 is a system known to those skilled in the art. As embodied herein, the EVS 120 could provide an image data set to the IG 140 for subsequent processing as discussed herein.

In an embodiment of FIG. 1, the navigation system 130 may be comprised of, but is not limited to, an air/data system, an attitude heading reference system, an inertial guidance system (or inertial reference system), a global navigation satellite system (or satellite navigation system), and a flight management computing system ("FMCS") which includes a navigation database configured to store waypoints, all of which are known to those skilled in the art. The navigation system could provide navigation data including, but not limited to, latitude, longitude, altitude, heading, and orientation attitudes related to pitch, roll, and yaw of the aircraft; the navigation data could also include flight plan information which identifies or states invisible objects such as waypoints and visible objects such as airports as discussed below. As embodied herein, a navigation system could provide navigation data to the IG 140 for subsequent processing as discussed herein.

It should be noted that, as embodied herein for any source or system in an aircraft including the navigation system 130, data could be comprised of any analog or digital signal, either discrete or continuous, which could contain information. As embodied herein, aircraft could mean any vehicle which is able to operate on the ground and/or fly through the air or atmosphere including, but not limited to, lighter than air vehicles and heavier than air vehicles, wherein the latter may include fixed-wing and rotary-wing vehicles.

In an embodiment of FIG. 1, the IG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "IG" is not limited to such processing units and its meaning is not intended to be construed narrowly. For instance, the IG 140 could also be comprised of more than one electronic data processing unit. As embodied herein, the IG 140 could be a processor(s) used by or in conjunction with any other system of the aircraft including, but not limited to, the SVS 110, the EVS 120, the navigation system 130, and the presentation system 150, or any combination thereof.

The IG 140 may be programmed or configured to receive as input data representative of information obtained from various systems and/or sources including, but not limited to, the SVS 110, the EVS 120, and the navigation system 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IG 140 may be programmed or configured to execute at least one method including the one discussed in detail below. The IG 140 may be programmed or configured to provide output data to various systems and/or units including, but not limited to, the presentation system 150.

In an embodiment of FIG. 1, the presentation system 150 could be comprised of a display unit such as a Head-Down Display ("HDD"), Head-Up Display ("HUD"), Head (or Helmet) Mounted Display ("HMD"), and/or a portable electronic device such as, but not limited to, a notebook computer and/or tablet. Each display unit may be configured to present the pilot with an SVS image, an EVS image, and/or a combined SVS-EVS image represented in a pixel data set(s) generated by the IG 140. As embodied herein, the presentation system 150 could be configured to receive one or more pixel data sets generated by the IG 140.

Figure 2A:
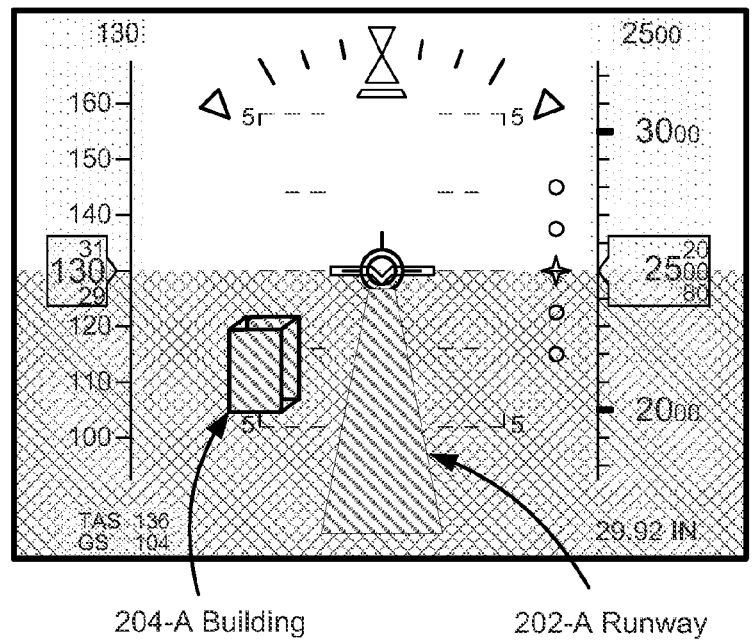
FIG. 2A depicts an exemplar depiction of a Head-Down Display ("HDD") unit configured to display tactical information against the background of a synthetic image.
Figure 2B:
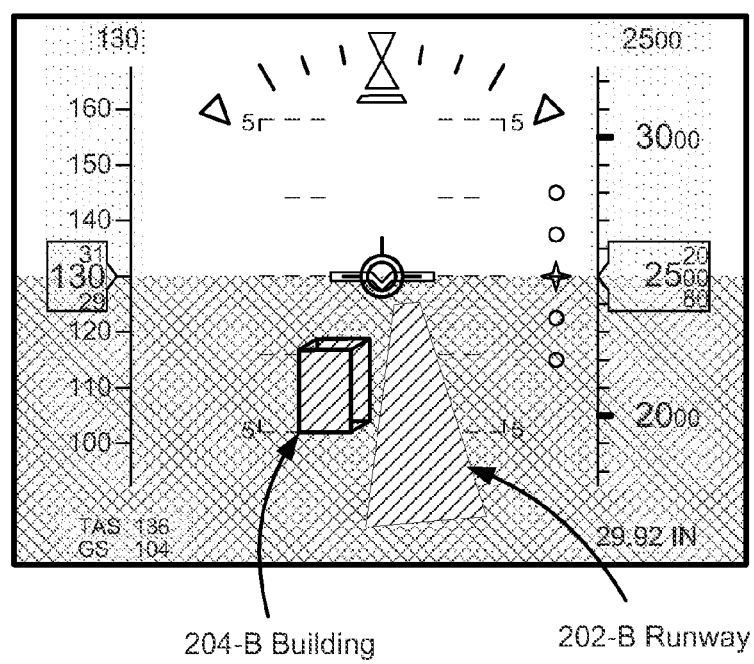
FIG. 2B depicts an exemplar depiction of an HDD unit configured to display tactical information against the background of an enhanced image.

Referring to FIGS. 2A and 2B, exemplar depictions of an HDD configured to display tactical information to the pilot against the background of an image is illustrated. For the purpose of illustration and not of limitation, FIG. 2A depicts a synthetic image that may be generated by the SVS 110 comprised of a runway 202-A and building 204-A (both shown in descending hatching fill) and surrounding terrain (indicated by the cross-hatching fill). FIG. 2B depicts an enhanced image that may be generated by the EVS 120 comprised of the runway 202-B and building 204-B (both shown in ascending hatching fill) and surrounding terrain (indicated by the cross-hatching fill), where runway 202-A and 202-B are the same surface and building 204-A and 204-B are the same structure.

As embodied herein, the enhanced image may be comprised of an image formed by combining images acquired from two or more EVS sensors at the same time, where each EVS sensor is configured to acquire image data from a different angle. The enhanced image may also be comprised of an image formed from a combination of images acquired from a single EVS sensor at different times. One advantage of employing two or more EVS sensors over a single EVS sensor is that the former may produce three-dimensional images for constant line of sight closure situations (e.g., constant aircraft glide path to a fixed landing zone).

It should be noted that the tactical information depicted on the HDDs of FIGS. 2A and 2B is minimal for the sake of presentation herein and not indicative of the plurality of indications or information (i.e., symbology) with which it may be configured. Because the indications or information shown on the HDDs of FIGS. 2A and 2B are well-known to those skilled in the art, a discussion of the specific tactical information is not necessary.

It should be further noted that, for the sake of presentation, the tactical information and terrain depicted on the HDDs shown in FIGS. 2A and 2B has been intentionally omitted from the exemplary displays of FIGS. 2C through 3C not indicative of the plurality of indications with which it may be configured; the omission of tactical information does not narrow the embodiments herein or create a limitation of them. Furthermore, the discussion that follows will be drawn to terrain that is level and comprised of the same elevation throughout the entire scene; the disclosures stated herein also apply to a scene in which the terrain is uneven. Moreover, although the remaining discussion will be drawn to the HDD, the embodiments disclosed herein may be applied to other display units such as, but not limited to, the HUD, the HMD, and/or the portable electronic device.

As observed by the screen locations of the runways 202 and building 204 in FIGS. 2A and 2B, there is an obvious misalignment between the synthetic and enhanced mages. The advantages and benefits of the embodiments discussed herein may be illustrated by showing an example of how the alignment of an image may be corrected by determining features located in a scene outside the aircraft from one three-dimensional model, comparing them with known features located in the scene outside the aircraft from a second three-dimensional model, and modifying a pixel data set representative of the scene outside the aircraft as a result of the comparison.

Figure 3A:
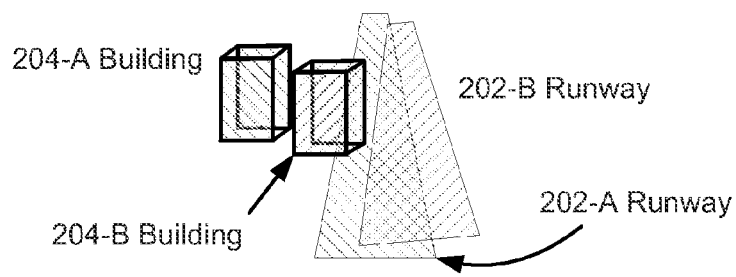
FIG. 3A depicts enhanced and synthetic three-dimensional models.

Referring to FIG. 3A, synthetic and enhanced three-dimensional models of both the synthetic and enhanced images are shown, respectively. For synthetic images of the runway 202-A and the building 204-A, the synthetic three-dimensional model could have been constructed using data retrieved from a terrain and/or obstacle database including metadata corresponding to feature information of known features (i.e., objects) based upon navigation data such as, but not limited to, aircraft position, heading, and a plurality of attitude orientation parameters.

Using algorithm(s) and/or techniques known to those skilled in the art, a three-dimensional model of enhanced images may be constructed from which features may be determined. The enhanced three-dimensional model could have been constructed using two sets of sensor data, where each set is representative of an image of the scene outside the aircraft. As stated above, an enhanced image may be formed by combining images, where each image being combined have been acquired at the same time by two or more image capturing devices or acquired at two different times by the same image capturing device. Once the three-dimensional model is constructed, features may be determined using algorithm(s) and/or techniques known to those skilled in the art. Referring to FIG. 3A, features comprised of the runway 202-B and the building 204-B are determinable, where an area such as the surface of the runway that is devoid of substantial vertical features may be identified as a feature itself. Once the features have been determined, they may be compared and matched with features of the synthetic three-dimensional model.

For the sake of illustration only, seven corners of the building 204-B (shown as points 8 through 14 in FIG. 3B) and the four corners of the runway 202-B (shown as points 19 through 22 in FIG. 3B) have been determined in the enhanced three-dimensional model. After the determination, these may be compared with and/or matched with the same, equivalent, and/or correlated features in the synthetic three-dimensional model, where the seven corners of the building 204-A (shown as points 1 through 7 in FIG. 3B) and the four corners of the runway 202-A (shown as points 15 through 18 in FIG. 3B) match with those of 204-B and 202-B, respectively. Because this comparison is performed with three-dimensional models, the height of features may be determined and used in the comparison.

Figure 3B:
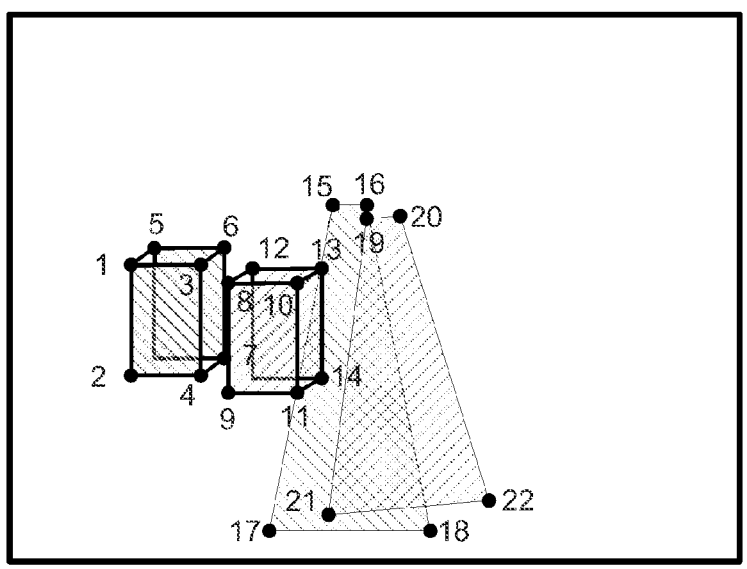
FIG. 3B depicts a plurality of points of correlating features in both an enhanced image and a synthetic image.
Figure 3C:
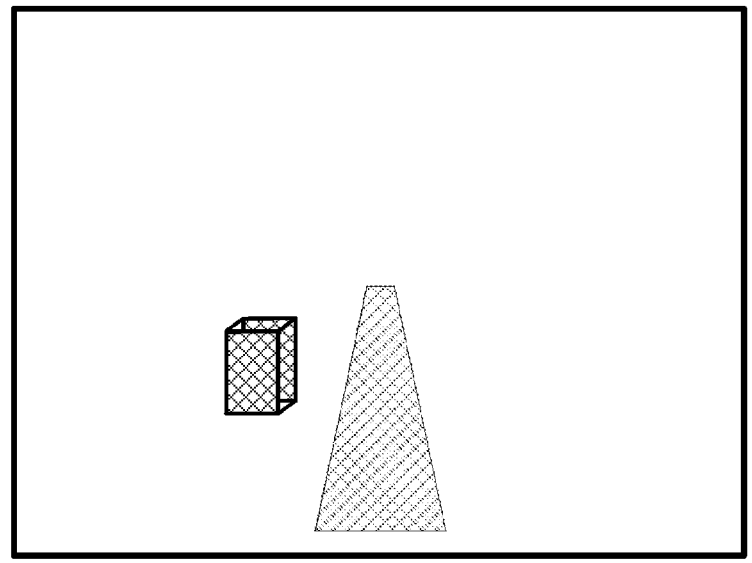
FIG. 3C depicts an overlay of a modified enhanced image against the synthetic image.
Figure 3D:
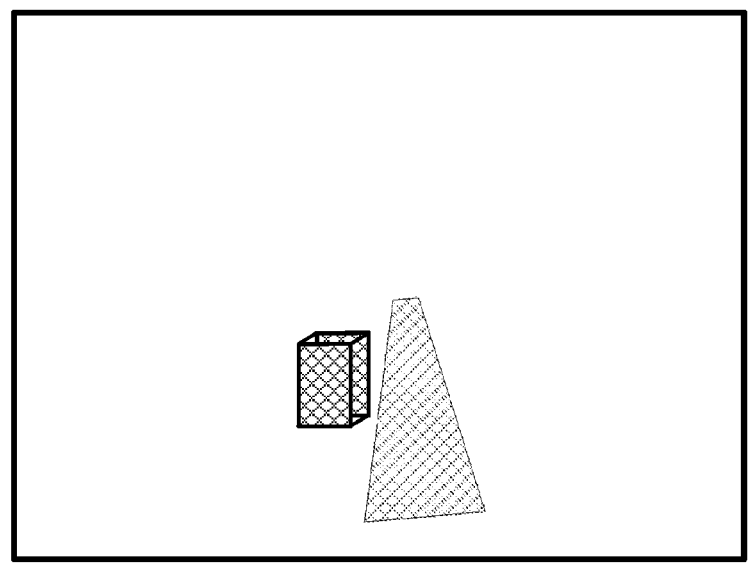
FIG. 3D depicts an overlay of a modified synthetic image against the enhanced image.

As a result of this feature-by-feature comparison, differences with one or more alignments of features may be determined and, to correct for misalignments, applied in the generation of a pixel data set(s) representative of the synthetic and enhanced images of a scene located outside the aircraft corresponding to the enhanced three-dimensional model and/or the synthetic three-dimensional model, respectively. As shown in FIG. 3B, pixel locations of the synthetic and enhanced images of each feature (shown in a (pixel column, pixel row) format) and pixel location differences are shown prior to a correction of misalignments. Once the alignment difference(s) have been determined, the pixels and/or pixel locations of the enhanced image may be modified by applying values corresponding to the differences; as a result, the enhanced image may be registered and used as an overlay against the synthetic image as shown in FIG. 3C. Alternatively, the pixels and/or pixel locations of the synthetic image may be modified by applying values corresponding to the differences; as a result, the synthetic image may be used as an overlay against the enhanced image as shown in FIG. 3D.

Moreover, both images may be modified by forming one image through a combination of more than one pixel data set, where alignment differences may be applied to one or more of the pixel data sets. Such pixel data sets could be combined in a number of ways known to those skilled in the art including data substitution, data blending (e.g., a weighted average of the two scenes), and data fusion (e.g., a creation of a composite scene based on a criteria such as the highest frequency edge content at similar locations in registered source images).

Figure 4:
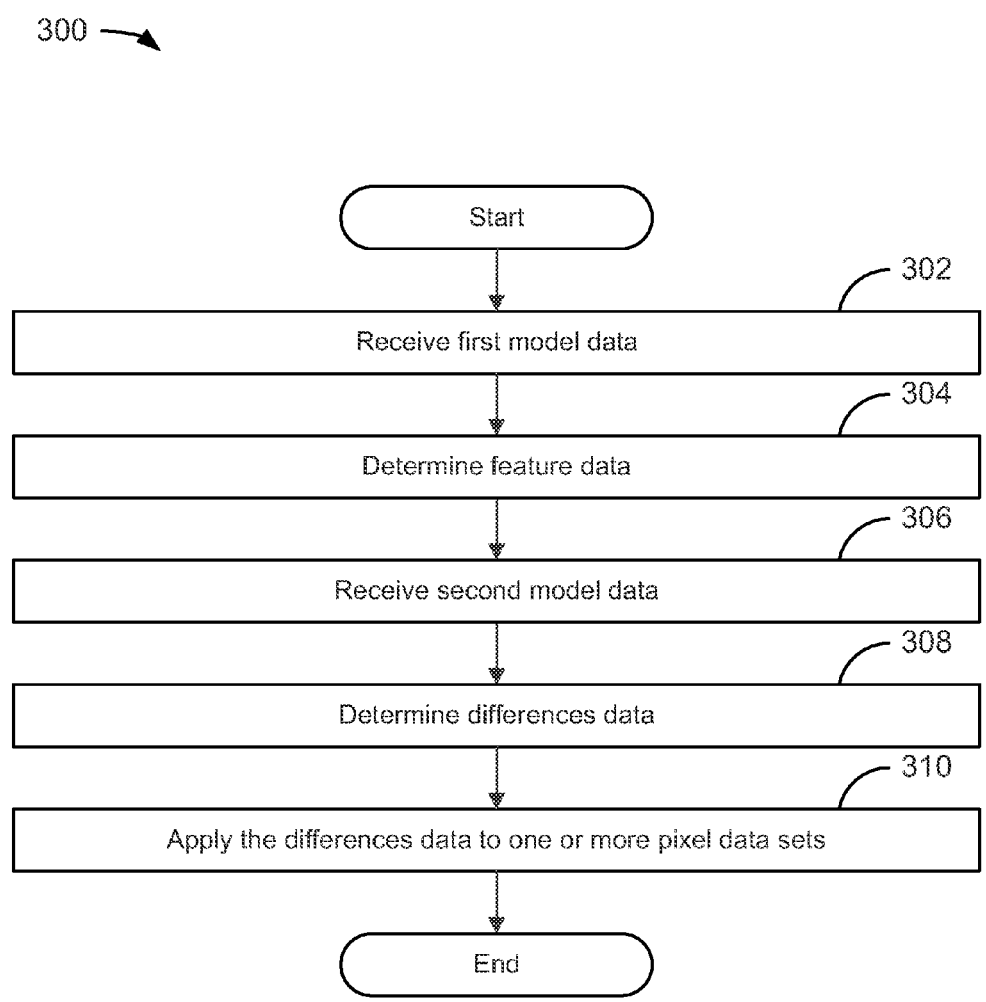
FIG. 4 depicts a flow chart of a method for correcting the alignment of an image.

FIG. 4 depicts flowchart 300 disclosing an example of a method for correcting a misalignment between images generated by a plurality of vision systems, where the IG 140 may be programmed or configured with instructions corresponding to the following modules embodied in flowchart 300. As embodied herein, the IG 140 may be a processor or a combination of processors found in the SVS 110, the EVS 120, the navigation system 130, and/or the presentation system 150. Also, the IG 140 may be a processor of a physical or tangible module such as, but not limited to, a printed circuit card having one or more input interfaces to facilitate the two-way data communications with the IG 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the supplying of data or the making of data available.

Flowchart 300 begins with module 302 with the receiving of first model data. This data may be representative of a first three-dimensional model of a scene outside the aircraft. As embodied herein, the first model data may have been generated from at least first sensor data and second sensor data. In one embodiment, the first sensor data and second sensor data may have been acquired by a first image capturing device and a second image capturing device, respectively. In another embodiment, the first sensor data and second sensor data may have been acquired at separate times by a single image capturing device, where changes in aircraft position and orientation between the acquisitions may be taken into account.

The flowchart continues with module 304 with the determining of feature data of one or more features located in the scene outside the vehicle. Such feature data could be comprised of object data representative of elevation and/or heights of terrain, obstacles, man-made structures, airport and off-airport surfaces, and/or naturally occurring environmental features such as lakes and rivers.

The flowchart continues with module 306 with the receiving of second model data. This data may be representative of a second three-dimensional model of the scene outside the aircraft. As embodied herein, the second model data may have been generated from feature data (or object data) retrieved from a terrain and/or obstacle database, where such feature data could include metadata corresponding to feature information of known features (i.e., objects) based upon navigation data such as, but not limited to, aircraft position, heading, and a plurality of attitude orientation parameters.

The flowchart continues with module 308 with the determining of differences data, where such data could be representative of differences between one or more correlating features that exist between models. This determination may be based upon a comparison between one or more features represented in the first model data with one or more correlating features represented in the second model data.

The flowchart continues with module 310 with the applying of differences data to one or more pixel data sets. Once the differences of a plurality of points have been determined, the pixels and/or pixel locations of an image represented in a pixel data set of the first model data may be modified using the values of the differences; as a result, this image may be presented on one or more display units of the presentation system 150 as an overlay against an image represented in a pixel data set of the second model data.

In another embodiment, the pixels and/or pixel locations of an image represented in a pixel data set of the second model data may be modified using the values of the differences; as a result, this image may be presented on one or more display units of the presentation system 150 as an overlay against an image represented in a pixel data set of the first model data.

In another embodiment, images represented in the pixel data sets of the first model data and/or second model data may be modified using the values of the differences by forming one image through a combination of more than one pixel data set. These pixel data sets could be combined in a number of ways known to those skilled in the art including data substitution, data blending (e.g., a weighted average of the two scenes), and data fusion (e.g., a creation of a composite scene based on a criteria such as the highest frequency edge content at similar locations in registered source images). The combined pixel data set may be presented on one or more display units of the presentation system 150. Then, flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for correcting image misalignment, such system comprising:
   a source of first model data;
   a source of second model data; and
   an image generator configured to:
      receive first model data representative of a first three-dimensional model of a plurality of images of an outside scene constructed from at least
         first image sensor data representative of a first image of the outside scene, and
         second image sensor data representative of a second image of the outside scene;
      identify at least one first feature of the constructed first three-dimensional model;
      determine feature data representative of each identified first feature located in the outside scene;
      receive second model data representative of a second three-dimensional model of the outside scene, where at least one second feature of the second three-dimensional model is located in the outside scene;
      determine differences data as a function of the constructed first three-dimensional model and the second three-dimensional model, where
         the differences data is representative of feature location differences between at least one first feature and at least one second feature; and
      apply the differences data in the generation of at least one pixel data set representative of the outside scene, such that
         at least one pixel data set is modified with the differences data.

2. The system of claim 1, wherein
the first image sensor data is acquired by a first image capturing device, and
the second image sensor data is acquired by a second image capturing device.

3. The system of claim 2, wherein the first image capturing device and the second image capturing device are employed by an enhanced vision system.

4. The system of claim 1, further comprising:
a source of navigation data, such that
the first image sensor data and the second image sensor data are acquired by one image capturing device at a plurality of times, and
the determination of feature data is based upon navigation data representative of at least aircraft position and aircraft orientation.

5. The system of claim 4, wherein the image capturing device is employed by an enhanced vision system.

6. The system of claim 1, wherein
the function for determining the differences data includes
a comparison of at least one location between
at least one first feature, and
at least one correlating second feature.

7. The system of claim 1, further comprising:
a presentation system configured to:
receive a plurality of pixel data sets from the image generator including at least one pixel data set modified with the differences data, where
images represented in the plurality of pixel data sets are presentable by at least one display unit.

8. The system of claim 1, further comprising:
a presentation system configured to:
receive a combined pixel data set from the image generator, where
the combined pixel data set is comprised of a combination of a plurality of pixel data sets including at least one pixel data set modified with the differences data, and
an image represented in the combined pixel data set is presentable by at least one display unit.

9. A device for correcting image misalignment, such device comprising:
an image generator configured to:
receive first model data representative of a first three-dimensional model of a plurality of images of an outside scene constructed from at least
first image sensor data representative of a first image of the outside scene, and
second image sensor data representative of a second image of the outside scene;
identify at least one first feature of the constructed first three-dimensional model;
determine feature data representative of each identified first feature located in the outside scene;
receive second model data representative of a second three-dimensional model of the outside scene, where
at least one second feature of the second three-dimensional model is located in the outside scene;
determine differences data as a function of the constructed first three-dimensional model and the second three-dimensional model, where
the differences data is representative of feature location differences between at least one first feature and at least one second feature; and
apply the differences data in the generation of at least one pixel data set representative of the outside scene, such that
at least one pixel data set is modified with the differences data.

10. The device of claim 9, wherein
the first image sensor data is acquired by a first image capturing device, and
the second image sensor data is acquired by a second image capturing device.

11. The device of claim 9, wherein
the first image sensor data and the second image sensor data are acquired by one image capturing device at a plurality of times, and
the determination of feature data is based upon navigation data representative of at least aircraft position and aircraft orientation.

12. The device of claim 9, wherein
the function for determining the differences data includes
a comparison of at least one location between
at least one first feature, and
at least one correlating second feature.

13. The device of claim 9, wherein
the image generator is further configured to:
provide a plurality of pixel data sets including at least one pixel data set modified with the differences data to a presentation system, where
images represented in the plurality of pixel data sets are presentable by at least one display unit.

14. The device of claim 9, wherein
the image generator is further configured to:
provide a combined pixel data set to a presentation system, where
the combined pixel data set is comprised of a combination of a plurality of pixel data sets including at least one pixel data set modified with the differences data, and
an image represented in the combined pixel data set is presentable by at least one display unit.

15. A method for correcting image misalignment, such method comprising:
receiving first model data representative of a first three-dimensional model of a plurality of images of an outside scene constructed from at least
first image sensor data representative of a first image of the outside scene, and
second image sensor data representative of a second image of the outside scene;
identifying at least one first feature of the constructed first three-dimensional model;
determining feature data representative of each identified first feature located in the outside scene;
receiving second model data representative of a second three-dimensional model of the outside scene, where
at least one second feature of the second three-dimensional model is located in the outside scene;
determining differences data as a function of the constructed first three-dimensional model and the second three-dimensional model, where
the differences data is representative of feature location differences between at least one first feature and at least one second feature; and
applying the differences data in the generation of at least one pixel data set representative of the outside scene, such that
at least one pixel data set is modified with the differences data.

16. The method of claim 15, wherein
the first image sensor data is acquired by a first image capturing device, and the second image sensor data is acquired by a second image capturing device.

17. The method of claim 15, wherein
the first image sensor data and the second image sensor data are acquired by one image capturing device at a plurality of times, and
the determination of feature data is based upon navigation data representative of at least aircraft position and aircraft orientation.

18. The method of claim 15, wherein
the function for determining the differences data includes a comparison of at least one location between
at least one first feature, and
at least one correlating second feature.

19. The method of claim 15, further comprising:
providing a plurality of pixel data sets including at least one pixel data set modified with the differences data to a presentation system, where
images represented in the plurality of pixel data sets are presentable by at least one display unit.

20. The method of claim 15, further comprising:
providing a combined pixel data set to a presentation system, where
the combined pixel data set is comprised of a combination of a plurality of pixel data sets including at least one pixel data set modified with the differences data, and
an image represented in the combined pixel data set is presentable by at least one display unit.

* * * * *